(12) United States Patent
Bao

(10) Patent No.: US 12,156,218 B2
(45) Date of Patent: Nov. 26, 2024

(54) CONFIGURATION INFORMATION OBTAINING AND SENDING METHOD, TERMINAL, AND NETWORK SIDE DEVICE

(71) Applicant: VIVO MOBILE COMMUNICATION CO., LTD., Guangdong (CN)

(72) Inventor: Wei Bao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 499 days.

(21) Appl. No.: 17/513,798

(22) Filed: Oct. 28, 2021

(65) Prior Publication Data

US 2022/0053485 A1 Feb. 17, 2022

Related U.S. Application Data

(63) Continuation of application No. PCT/CN2020/086710, filed on Apr. 24, 2020.

(30) Foreign Application Priority Data

Apr. 29, 2019 (CN) .......................... 201910355312.7

(51) Int. Cl.
*H04W 72/21* (2023.01)
*H04W 8/22* (2009.01)
(Continued)

(52) U.S. Cl.
CPC ............. *H04W 72/21* (2023.01); *H04W 8/22* (2013.01); *H04W 24/02* (2013.01); *H04W 72/23* (2023.01)

(58) Field of Classification Search
None
See application file for complete search history.

(56) References Cited

U.S. PATENT DOCUMENTS

2016/0105917 A1 4/2016 Miao et al.
2018/0269947 A1 9/2018 Levitsky et al.
(Continued)

FOREIGN PATENT DOCUMENTS

CN 108023702 A 5/2018
CN 108112022 A 6/2018
(Continued)

OTHER PUBLICATIONS

International Search Report of International Application No. PCT/CN2020/086710 mailed on Jul. 9, 2020.
(Continued)

*Primary Examiner* — Adolf Dsouza
(74) *Attorney, Agent, or Firm* — IP & T GROUP LLP

(57) ABSTRACT

A configuration information obtaining method includes: in a case that the terminal stores valid first configuration information, sending first indication information to a network side device; and receiving second indication information sent by the network side device. The first indication information is used to indicate that the terminal stores the valid first configuration information. The second indication information is used to indicate at least one of: whether the terminal uses the stored first configuration information; a number corresponding to the stored first configuration information used by the terminal; or a type corresponding to the stored first configuration information used by the terminal.

18 Claims, 3 Drawing Sheets

(51) Int. Cl.
    *H04W 24/02*    (2009.01)
    *H04W 72/23*    (2023.01)

(56) References Cited

U.S. PATENT DOCUMENTS

| | | | | |
|---|---|---|---|---|
| 2019/0261447 | A1* | 8/2019 | Fujishiro | H04W 76/30 |
| 2019/0273597 | A1 | 9/2019 | Jiang | |
| 2020/0205047 | A1* | 6/2020 | Bergqvist | H04W 36/0077 |
| 2020/0344629 | A1* | 10/2020 | Kim | H04W 48/16 |
| 2021/0400653 | A1* | 12/2021 | Yang | H04W 72/23 |

FOREIGN PATENT DOCUMENTS

| | | | | |
|---|---|---|---|---|
| CN | 104521313 B | * | 3/2019 | H04W 76/10 |
| CN | 109548072 A | | 3/2019 | |

OTHER PUBLICATIONS

Written Opinion of The International Searching Authority of International Application No. PCT/CN2020/086710 mailed on Jul. 9, 2020.
IPWireless Inc., ON Retaining RRC Context, R2-121550, 3GPP TSG RAN WG2 Meeting #77b, Mar. 2012.
First Office Action of Priority Application No. 201910355312.7 mailed on Apr. 1, 2021.
Second Office Action of Priority Application No. 201910355312.7 mailed on Sep. 17, 2021.

* cited by examiner

CONFIGURATION INFORMATION OBTAINING AND SENDING METHOD, TERMINAL, AND NETWORK SIDE DEVICE

CROSS-REFERENCE TO RELATED APPLICATIONS

This application is a Bypass Continuation Application of PCT/CN2020/086710 filed on Apr. 24, 2020, which claims priority to Chinese Patent Application No. 201910355312.7 filed on Apr. 29, 2019, which are incorporated herein by reference in their entirety.

TECHNICAL FIELD

The present disclosure relates to the field of communications technologies, and in particular, to a configuration information obtaining and sending method, a terminal, and a network side device.

BACKGROUND

In a mobile communications network, a cell sends same configuration to user equipment (UE, also referred to as a terminal). In a mechanism in the related art, same UE accesses a same cell for a plurality of times, and the cell needs to send complete configuration information to the UE each time. A manner of sending the complete configuration information each time causes relatively heavy signaling overheads.

SUMMARY

According to a first aspect, an embodiment of the present disclosure provides a configuration information obtaining method, applied to a terminal and including:
  in a case that the terminal stores valid first configuration information, sending first indication information to a network side device, where the first indication information is used to indicate that the terminal stores the valid first configuration information; and
  receiving second indication information sent by the network side device, where
  the second indication information is used to indicate at least one of:
  whether the terminal uses the stored first configuration information;
  a number corresponding to the stored first configuration information used by the terminal; or
  a type corresponding to the stored first configuration information used by the terminal.

According to a second aspect, an embodiment of the present disclosure provides a configuration information sending method, applied to a network side device and including:
  receiving first indication information sent by a terminal, where the first indication information is used to indicate that the terminal stores valid first configuration information; and
  sending second indication information to the terminal based on the first indication information, where
  the second indication information is used to indicate at least one of:
  whether the terminal uses the stored first configuration information;
  a number corresponding to the stored first configuration information used by the terminal; or
  a type corresponding to the stored first configuration information used by the terminal.

According to a third aspect, an embodiment of the present disclosure provides a terminal, including:
  a first sending module, configured to: in a case that the terminal stores valid first configuration information, send first indication information to a network side device, where the first indication information is used to indicate that the terminal stores the valid first configuration information; and
  a first receiving module, configured to receive second indication information sent by the network side device, where
  the second indication information is used to indicate at least one of:
  whether the terminal uses the stored first configuration information;
  a number corresponding to the stored first configuration information used by the terminal; or
  a type corresponding to the stored first configuration information used by the terminal.

According to a fourth aspect, an embodiment of the present disclosure provides a terminal, including: a processor, a memory, a computer program that is stored in the memory and executable on the processor, where when the computer program is executed by the processor, the steps of the foregoing configuration information obtaining method are implemented.

According to a fifth aspect, an embodiment of the present disclosure provides a network side device, including:
  a second receiving module, configured to receive first indication information sent by a terminal, where the first indication information is used to indicate that the terminal stores valid first configuration information; and
  a second sending module, configured to send second indication information to the terminal based on the first indication information, where
  the second indication information is used to indicate at least one of:
  whether the terminal uses the stored first configuration information;
  a number corresponding to the stored first configuration information used by the terminal; or
  a type corresponding to the stored first configuration information used by the terminal.

According to a sixth aspect, an embodiment of the present disclosure provides a network side device, including: a processor, a memory, a computer program that is stored in the memory and executable on the processor, where when the computer program is executed by the processor, the steps of the foregoing configuration information sending method are implemented.

According to a seventh aspect, an embodiment of the present disclosure provides a non-transitory computer-readable storage medium, where the non-transitory computer-readable storage medium stores a computer program, and when the computer program is executed by a processor, the steps of the foregoing configuration information obtaining method or the foregoing configuration information sending method are implemented.

DESCRIPTION OF EMBODIMENTS

Figure 1:
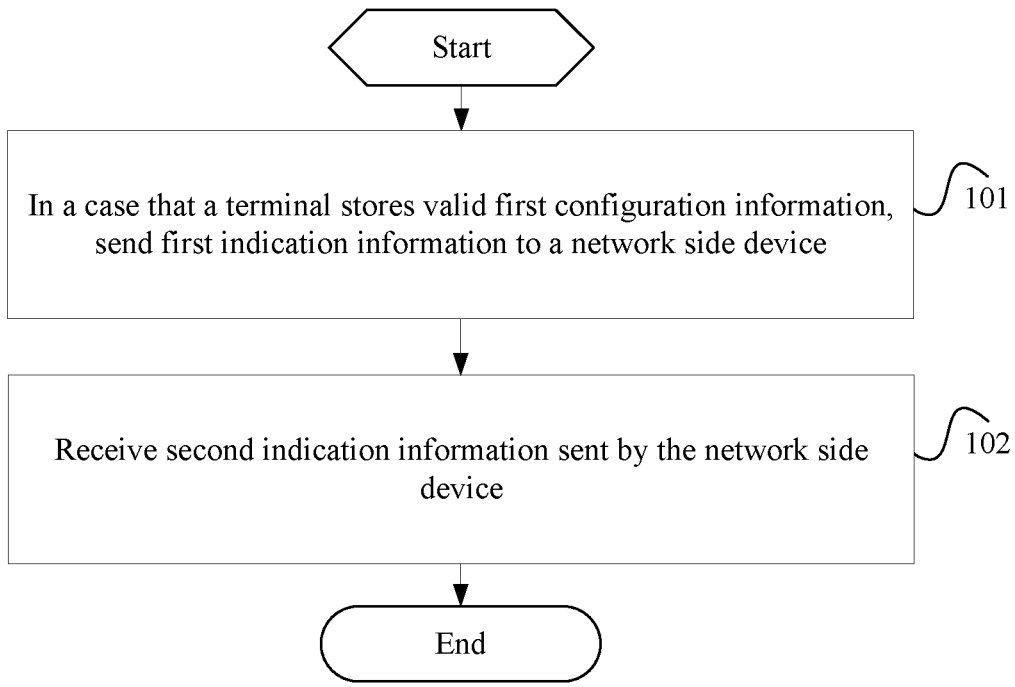
FIG. 1 is a schematic flowchart of a configuration information obtaining method according to an embodiment of the present disclosure.

To make the objectives, technical solutions, and advantages of the present disclosure clearer, the following further describes the present disclosure in detail with reference to the accompanying drawings and specific embodiments.

Before the embodiments of the present disclosure are described, some concepts used in the following description are explained first.

1. Network Configuration

In a Long Term Evolution (LTE)/New Radio (NR) network (NW), after UE accesses the network, a serving cell of the UE needs to provide configuration information for the UE. The UE uses the configuration information to obtain a service of the network. The following is an example of some content included in the configuration information:

A11. Measurement configuration;
A12. Security configuration;
A13. Common configuration of the serving cell (ServingCellConfigCommon);
A14. Medium Access Control (MAC) layer configuration of a cell group (MAC-CellGroupConfig);
A15. Physical (PHY) layer configuration of the cell group (PhysicalCellGroupConfig).

The NW may configure the UE by using a message such as a radio resource control (RRC) connection reconfiguration message (RRC Connection Reconfiguration, used for naming in LTE)/RRC reconfiguration message (RRC Reconfiguration, used for naming in NR), an RRC connection setup message (RRC Connection Setup)/RRC setup message (RRC Setup), or an RRC connection resume message (RRC Connection Resume)/RRC resume message (RRC Resume).

Some of the foregoing configurations change frequently, such as the security configuration. Some of the foregoing configurations rarely change, such as the measurement configuration and the common configuration of the serving cell. That is, if same UE accesses a same cell twice, a measurement configuration corresponding to the serving cell and a common configuration of the serving cell are probably the same.

2. Carrier Aggregation

Carrier aggregation means that a terminal simultaneously uses spectrum resources of a plurality of serving cells to perform data transmission, to improve a throughput of the terminal in performing data receiving and sending.

If serving cells configured by the network for UE belong to a same base station, this is referred to as carrier aggregation (CA). A secondary cell is also referred to as a SCell (Secondary Cell). A dual connectivity (DC) technology is similar to the CA. If serving cells configured by the network for UE belong to two base stations (a master base station is an MN (Master Node), and a secondary base station is an SN (Secondary Node)), this is referred to as the DC.

If same UE accesses a same cell for a plurality of times, the cell needs to send complete configuration information to the UE each time, even if configuration information sent for an N-th time (N>1) is completely or partially the same as configuration information sent for the first time. The N-th time (N>1) of sending of the complete configuration information causes signaling waste for the UE.

The present disclosure provides a configuration information obtaining and sending method, a terminal, and a network side device for the foregoing problem.

As shown in FIG. 1, an embodiment of the present disclosure provides a configuration information obtaining method, applied to a terminal and including:

Step 101: In a case that the terminal stores valid first configuration information, send first indication information to a network side device.

The first indication information is used to indicate that the terminal stores the valid first configuration information.

Step 102: Receive second indication information sent by the network side device.

The second indication information is used to indicate at least one of:
whether the terminal uses the stored first configuration information;
a number corresponding to the stored first configuration information used by the terminal; or
a type corresponding to the stored first configuration information used by the terminal.

It should be noted that the first configuration information stored by the terminal may include a plurality of types of configuration information, for example, at least one of the foregoing mentioned A11-A15. Based on different terminals or different services of a same terminal, for a same type of configuration information, parameter values configured for the terminal by a same cell may be different. Therefore, configuration information with different parameters needs to be distinguished by using different numbers. The number may be a version number of configuration information, that is, the number is used to indicate configuration information of a version. One number may correspond to one set of configuration information in the first configuration information (the set of configuration information is a plurality of types of configuration information applied to one service). It should be further noted that a same type of configuration information for different services may also be distinguished by using different numbers, that is, for the stored first configuration information, configuration information of each type (for example, A11-A15) may have a different number.

It should be noted that the first indication information carries at least one of the following information to indicate that the terminal stores the valid first configuration information:

B11. Indication that the terminal stores the first configuration information.

It should be noted that the indication is represented by a specific quantity of bits (for example, one bit). For example, when the terminal reports the specific quantity of bits, it indicates that the terminal stores the valid first configuration information.

B12. Type of the first configuration information stored by the terminal.

It should be noted that, in this manner, the network side device is directly notified of the type of the stored first configuration information (for example, A11 measurement configuration). When receiving information about the type of the stored first configuration information, the network side device can learn that the valid first configuration information stored by the terminal includes A11 measurement configuration.

B13. At least one number corresponding to the first configuration information.

It should be noted that the terminal may store a plurality of sets of configuration information (for example, configuration information whose numbers are 1 and 2 respectively) or store a plurality of versions for a same type of configuration information (for example, A11 measurement configuration whose numbers are 1 and 2 respectively). In this manner, the network side device is directly notified of the at least one number corresponding to the stored first configuration information. When receiving information about the at least one number corresponding to the stored first configuration information, the network side device can learn that the terminal stores the valid first configuration information.

It should be noted that the terminal sends, to the network side device, the first indication information indicating that the valid first configuration information is stored. When the network side device feeds back configuration information to the terminal, in a case that the network side device determines that the terminal can use configuration information previously stored by the terminal, the network side device may not need to resend the configuration information to the terminal, but indicate that the terminal can use the stored configuration information, and the terminal uses the stored configuration by default in this case. Alternatively, the number corresponding to the stored first configuration information used by the terminal is directly indicated, and the terminal uses configuration information corresponding to the number indicated by the network side device in this case. Alternatively, the type corresponding to the stored first configuration information used by the terminal is directly indicated, and the terminal uses configuration information corresponding to the type indicated by the network side device in this case. Alternatively, the type and the number that are corresponding to the stored first configuration information used by the terminal are directly indicated, and the terminal uses configuration information corresponding to both the type and the number that are indicated by the network side device in this case. Alternatively, when it indicates that the terminal can use stored information, the number corresponding to the stored first configuration information used by the terminal is further indicated, and the terminal uses, based on the foregoing indication, configuration information corresponding to the number indicated by the network side device in this case.

It should be further noted that, before step 101, the first configuration information needs to be first stored. An implementation of this embodiment of the present disclosure is: receiving a configuration message sent by the network side device; and storing the first configuration information in the configuration message.

To facilitate the terminal to learn a number of configuration information, the configuration message includes a number of at least one piece (that is, one or more pieces) of configuration information. For example, a same configuration message includes numbers of two types of configuration information: a number 2 of a common configuration of a serving cell, and a number 3 of a measurement configuration; or a configuration message includes a uniform number, that is, different types of configuration information in a configuration message corresponds to a same number.

It should be further noted that the network side device may configure a same piece of configuration information by using a plurality of configuration messages. For example, the common configuration of the serving cell is configured by using a configuration message 1, and then the common configuration of the serving cell is reconfigured by using a configuration message 2 after a period of time. Therefore, the terminal may store the common configuration (corresponding to different numbers) of the serving cell that is configured twice, or store the last configuration and the corresponding number.

Optionally, an implementation of the storing the first configuration information in the configuration message is:

obtaining first information, and storing the first configuration information in the configuration message based on the first information.

It should be noted that the first information includes at least one of:

B21. Third indication information, where the third indication information is used to indicate whether to store the first configuration information.

It should be noted that the third indication information is indicated by the network side device. For example, the network side device may add the third indication information to the configuration message, or may add the third indication information in another downlink message that is different from the configuration message.

Optionally, in this case, an implementation of the storing the first configuration information in the configuration message based on the first information is:

storing the first configuration information in the configuration message in a case that the third indication information indicates to store the first configuration information.

It should be further noted that an implementation of the network side device during implementation is as follows:

Manner 1: The network side device may add the third indication information to the configuration message or another downlink message, where the third indication information is an indication of storing the first configuration information, that is, when the terminal finds the third indication information in the received configuration message or another downlink message, the first configuration information in the configuration message needs to be stored.

Manner 2: The network side device may add the third indication information to the configuration message or another downlink message, where the third indication information is an indication of whether to store the first configuration information. For example, 1 bit may be used to represent the third indication information. When the bit is a first value, it indicates not to store the first configuration information, and when the bit is a second value, it indicates to store the first configuration information. The terminal stores the first configuration information in the configuration message only when determining that the third indication information indicates to store the first configuration information.

B22. Type corresponding to configuration information to be stored.

It should be noted that the type corresponding to the configuration information to be stored may be indicated by the network side device or agreed upon in a protocol. For example, the network side device may add, to the configuration message, the type corresponding to the configuration information to be stored, or may add, to another downlink message that is different from the configuration message, the type corresponding to the configuration information to be stored. Alternatively, the type corresponding to the configuration information to be stored is directly agreed upon in the protocol, and the network side device and the terminal may directly obtain the type by using the communications protocol.

Optionally, in this case, the storing the first configuration information in the configuration message based on the first information includes:

storing the first configuration information corresponding to the type in the configuration message.

It should be noted that, during implementation of this embodiment of the present disclosure, the third indication information may be indicated only by using the network side device, and the terminal stores the first configuration information in the configuration message in this case. Alternatively, the type corresponding to the configuration information to be stored may be indicated only by using the network side device, and the terminal stores the first configuration information corresponding to the type in the configuration message in this case. Alternatively, the third indication information and the type corresponding to the configuration information to be stored may be indicated by using the network side device, and the terminal determines, based on the third indication information, that the first configuration information needs to be stored, but the terminal actually stores the first configuration information corresponding to the type in the configuration message in this case. It should be further noted that, in this embodiment of the present disclosure, the type corresponding to the configuration information to be stored may be indicated according to a protocol agreement, and then the configuration information agreed upon in the protocol is stored based on the third indication information indicated by the network side device. For example, according to the protocol, a common configuration of a serving cell needs to be stored. If the configuration message indicates that the configuration information needs to be stored, the terminal stores the common configuration of the serving cell included in the configuration message, and does not store another configuration.

It should be further noted that before the receiving a configuration message sent by the network side device, the method in this embodiment of the present disclosure further includes:

sending fourth indication information to the network side device, where the fourth indication information is used to indicate that the terminal has a capability of storing configuration information and reporting the configuration information.

It should be noted that the capability of storing the configuration information and reporting the configuration information means that the terminal can store the configuration information, and can also notify the network side device of the configuration information stored by the terminal.

The network side device may determine, based on the fourth indication information sent by the terminal, whether to send the foregoing first information to the terminal. The network side device may also deliver, based on the fourth indication information sent by the terminal, a downlink message that triggers the terminal to report the first indication information.

It should be further noted that when sending the configuration message to the terminal, the network side device may further notify the terminal of an area in which configuration information in the configuration message can be used. For example, before the sending first indication information to a network side device, the method further includes:

obtaining an identifier of a valid area corresponding to the configuration message sent by the network side device; and storing the identifier of the valid area, where the identifier of the valid area includes an identifier of a serving cell (in this case, an identifier of a cell) or an identifier of a cell group in which the serving cell is located (in this case, an identifier of an area).

For example, the identifier of the cell group is represented in one of:

a group identifier, a cell list, a radio access network based notification area list (RNA list), a tracking area list (TA list), or a public land mobile network list (PLMN list).

For example, a group identifier is distinguished by using an ID. If a cell broadcasts the ID, it indicates that the cell belongs to a valid area corresponding to the ID. Otherwise, the cell does not belong to the valid area corresponding to the ID.

For example, if the network side device notifies that the valid area corresponding to the configuration message is a cell 1, and the terminal stores configuration information, the configuration information stored by the terminal is valid only in the cell 1, and another cell (for example, a cell 2) is not in the valid area corresponding to the configuration message. For example, the network side device notifies that the valid area corresponding to the configuration message is a cell 1, the terminal stores configuration information, and a valid area corresponding to the configuration information is the cell 1. When a serving cell of the terminal changes to the cell 2, the terminal performs measurement based on a configuration of the cell 2. If a measurement result includes a measurement result of the cell 1, the terminal needs to add the first indication information when reporting the measurement result to the network side device; or if the measurement result does not include the measurement result of the cell 1, the terminal does not need to add the first indication information when reporting the measurement result to the network side device (it is assumed herein that the terminal stores only configuration information in which the valid area is the cell 1).

It should be further noted that after storing the first configuration information, the terminal can continue to store the first configuration information or use the first configuration information only when the first configuration information belongs to a validity period. When the first configuration information does not belong to the validity period, it indicates that the first configuration information is unavailable. To avoid that too much configuration information occupies a memory of the terminal, the terminal may further delete the stored first configuration information. An implementation is:

if valid duration of the first configuration information stored by the terminal exceeds first duration, setting a state of the first configuration information to an invalid state or deleting the stored first configuration information.

Timing starts for the valid duration when the terminal receives the configuration message or the terminal stores the first configuration information. The first duration is configured by the network side device or agreed upon in a protocol.

That is, the terminal sends the first indication information to the network side device only in a case that the terminal stores the valid first configuration information.

It should be further noted that the terminal reports the first indication information to enable the network side device to optimize configuration signaling. If the network side device cannot optimize configuration signaling, the terminal reports the first indication information, and the network side device cannot identify the first indication information. Therefore, in this embodiment of the present disclosure, before the sending first indication information to a network side device, the method further includes:

receiving fifth indication information sent by the network side device, where the fifth indication information is used to indicate that the network side device allows the terminal to report the first indication information.

It should be further noted that the network side device cannot optimize configuration signaling at any time. Therefore, in this embodiment of the present disclosure, before the sending first indication information to a network side device, the method further includes:

receiving a downlink message sent by the network side device, where the downlink message is used to trigger the terminal to report the first indication information.

The terminal sends the first indication information only when receiving the downlink message that triggers the terminal to report the first indication information, so that the network side device can process the first indication information sent by the terminal in a timely manner.

It should be further noted that the first indication information is carried in a first message, and the first message includes a radio resource control (RRC) setup request message, an RRC setup complete message, an RRC resume request message, an RRC resume complete message, an RRC connection re-setup request message, an RRC connection re-setup complete message, or a measurement report message.

It should be further noted that the terminal may determine, based on the second indication information sent by the network side device, how to use configuration information in a subsequent communication process. For example, when the second indication information is used to indicate whether the terminal uses the stored first configuration information, after the receiving second indication information sent by the network side device, the method further includes:

if the second indication information is used to indicate the terminal to use the stored first configuration information, using, by the terminal, the first configuration information, that is, performing, by the terminal, communication by using the first configuration information in the subsequent communication process.

For example, when the second indication information is used to indicate the number corresponding to the stored first configuration information used by the terminal or the type corresponding to the stored first configuration information used by the terminal, after the receiving second indication information sent by the network side device, the method further includes:

using, by the terminal, configuration information corresponding to the number or the type in the first configuration information, that is, if the second indication information is used to indicate the number corresponding to the stored first configuration information used by the terminal, performing, by the terminal in the subsequent communication process, communication by using configuration information corresponding to the number indicated by the second indication information in the stored first configuration information; or if the second indication information is used to indicate the type corresponding to the stored first configuration information used by the terminal, performing, by the terminal in the subsequent communication process, communication by using configuration information corresponding to the type indicated by the second indication information in the stored first configuration information.

When the second indication information is used to indicate whether the terminal uses the stored first configuration information and the number corresponding to the stored first configuration information used by the terminal, if the second indication information is used to indicate the terminal to use the stored first configuration information, the terminal performs communication by using the configuration information corresponding to the number in the first configuration information.

When the second indication information is used to indicate whether the terminal uses the stored first configuration information and the type corresponding to the stored first configuration information used by the terminal, if the second indication information is used to indicate the terminal to use the stored first configuration information, the terminal performs communication by using the configuration information corresponding to the type in the first configuration information.

It should be further noted that when the second indication information indicates the type and the number that are corresponding to the stored first configuration information used by the terminal, the terminal uses the configuration information corresponding to the type and the number in the corresponding first configuration information.

When the second indication information is used to indicate whether the terminal uses the stored first configuration information, the type corresponding to the stored first configuration information used by the terminal, and the number corresponding to the stored first configuration information used by the terminal, if the second indication information is used to indicate the terminal to use the stored first configuration information, the terminal performs communication by using the configuration information corresponding to the type and the number in the first configuration information.

It should be further noted that, in some cases, the network side device may need to adjust configuration information. In this case, the network side device needs to deliver new configuration information to the terminal. An implementation is: after the sending first indication information to a network side device, the method further includes:

receiving second configuration information sent by the network side device.

It should be noted that the second configuration information includes at least one of:

B31. Configuration information that is included in the first configuration information and that needs to be changed.

It should be noted that in this case, after applying information in the stored first configuration information, the terminal changes a related configuration based on the second configuration information. In the subsequent communication process, updated information needs to be used.

B32. Configuration information that is not included in the first configuration information.

It should be noted that when there is no target configuration subsequently used by the terminal in the first configuration information stored by the terminal, the network side device needs to send the target configuration to the terminal.

It should be noted that after receiving the second configuration information, the terminal further needs to store the second configuration information.

A configuration process of the foregoing second configuration information is referred to as a differential configuration, that is, after the stored first configuration information is applied, the target configuration and a part that is different from a first configuration are configured, so that the terminal applies the target configuration and the part that is different from the first configuration.

For example, a measurement configuration stored by the terminal includes N parameters. The terminal receives the configuration message of the network side device, applies the stored N parameters, and reconfigures X of the N parameters, and the network side device indicates the terminal to store the measurement configuration. The measurement configuration stored by the terminal is N–X original values that are not reconfigured in the N parameters and X latest values that are reconfigured.

It should be further noted that if the network side device indicates that a version corresponding to a new configuration is A, the version A in the measurement configuration stored by the terminal is the N–X original values that are not reconfigured and the X latest values that are reconfigured.

It should be further noted that after the terminal receives the second configuration information sent by the network side device, the method further includes:
  using, by the terminal, the second configuration information.

It should be noted that after storing the first configuration information, the terminal may subsequently access a same cell or another cell. For example, when the first configuration information is configuration information for a first area, the sending first indication information to a network side device includes:
  in a case that a second cell included in the first area is accessed, sending the first indication information to the network side device corresponding to the second cell.

It should be noted that the first area is a valid area corresponding to the first configuration information (the valid area is an area indicated by the foregoing identifier of the valid area). That is, the terminal reports the first indication information only when the accessed cell matches the valid area corresponding to the stored first configuration information (the accessed cell belongs to the valid area), and the terminal reports the second indication information that is used to indicate the terminal to store configuration information of the valid area. For example, when the terminal reports a number of configuration information, the terminal reports a number of configuration information of a valid area corresponding to the second cell.

It should be further noted that, in a case of carrier aggregation, to assist the network side device in performing cell handover and addition of a secondary cell, in this embodiment of the present disclosure, before the sending first indication information to a network side device, the method further includes:
  performing neighboring cell measurement to obtain a measurement result.

Optionally, the sending first indication information to a network side device includes:
  if the measurement result includes a measurement result of a first cell and configuration information of a valid area to which the first cell belongs exists in the first configuration information stored by the terminal, sending a measurement report message to the network side device, where the measurement report message carries the first indication information, and the first indication information is used to indicate that the terminal stores the configuration information of the valid area to which the first cell belongs.

For example, the first indication information is further used to indicate:
  identifier information of the valid area corresponding to the first configuration information.

That is, the terminal reports the first indication information to the network side device only when a cell included in the reported measurement result matches the valid area corresponding to the stored first configuration information.

After the network side device receives the measurement report message, in a case of handover and addition of a secondary cell, differential configuration is performed on the terminal based on content of the first indication information.

It should be noted that, this embodiment of the present disclosure can reduce overheads of configuration signaling, and is particularly applicable to a scenario in which the terminal does not move for a long time or moves in a fixed area.

Figure 2:
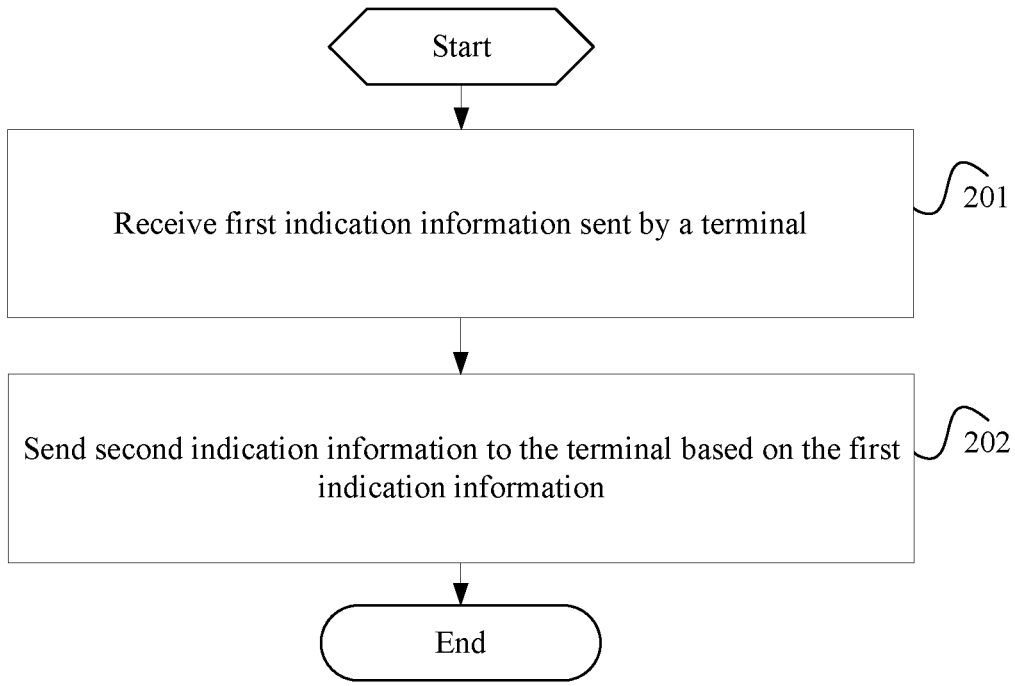
FIG. 2 is a schematic flowchart of a configuration information sending method according to an embodiment of the present disclosure.

As shown in FIG. 2, an embodiment of the present disclosure provides a configuration information sending method, applied to a network side device and including:
  Step 201: Receive first indication information sent by a terminal, where the first indication information is used to indicate that the terminal stores valid first configuration information.
  Step 202: Send second indication information to the terminal based on the first indication information.

The second indication information is used to indicate at least one of:
  whether the terminal uses the stored first configuration information;
  a number corresponding to the stored first configuration information used by the terminal; or
  a type corresponding to the stored first configuration information used by the terminal.

Optionally, before the receiving first indication information sent by a terminal, the method further includes:
  sending a configuration message to the terminal, where the configuration message includes the first configuration information.

For example, the configuration message includes a number of configuration information.

Optionally, before the receiving first indication information sent by a terminal, the method further includes:
  sending first information to the terminal, where
  the first information includes at least one of:
  third indication information, where the third indication information is used to indicate whether to store the first configuration information; or
  a type corresponding to configuration information to be stored.

Optionally, before the sending a configuration message to the terminal, the method further includes:
  receiving fourth indication information sent by the terminal, where the fourth indication information is used to indicate that the terminal has a capability of storing configuration information and reporting the configuration information.

Optionally, before the receiving first indication information sent by a terminal, the method further includes:
  sending an identifier of a valid area corresponding to the configuration message to the terminal, where
  the identifier of the valid area includes an identifier of a serving cell or an identifier of a cell group in which the serving cell is located.

For example, the identifier of the cell group is represented in one of:
  a group identifier, a cell list, a radio access network based notification area list, a tracking area list, or a public land mobile network list.

Optionally, before the receiving first indication information sent by a terminal, the method further includes:

sending fifth indication information to the terminal, where the fifth indication information is used to indicate that the network side device allows the terminal to report the first indication information.

Optionally, the first indication information is carried in a first message, and the first message includes a radio resource control RRC setup request message, an RRC setup complete message, an RRC resume request message, an RRC resume complete message, an RRC connection re-setup request message, an RRC connection re-setup complete message, or a measurement report message.

For example, the first indication information carries at least one of:
- an indication that the terminal stores the first configuration information;
- a type of the first configuration information stored by the terminal; or
- at least one number corresponding to the first configuration information.

Optionally, before the receiving first indication information sent by a terminal, the method further includes:

sending a downlink message to the terminal, where the downlink message is used to trigger the terminal to report the first indication information.

Optionally, after the receiving first indication information sent by a terminal, the method further includes:

sending second configuration information to the terminal, where the second configuration information includes at least one of:
- configuration information that is included in the first configuration information and that needs to be changed; or
- configuration information that is not included in the first configuration information.

Optionally, the receiving first indication information sent by a terminal includes:

receiving a measurement report message fed back by the terminal, where the measurement report message carries first indication information, and the first indication information is used to indicate that configuration information of a valid area to which a first cell belongs exists in the first configuration information stored by the terminal; and after the receiving a measurement report message fed back by the terminal, the method further includes:

in a case of handover and addition of a secondary cell, performing differential configuration on the terminal based on the configuration information of the valid area to which the first cell belongs.

For example, the first indication information is further used to indicate:
identifier information of the valid area corresponding to the first configuration information.

It should be noted that all descriptions of the network side device in the foregoing embodiment are applicable to the embodiment of the configuration information sending method, and a same technical effect can also be achieved.

Figure 3:
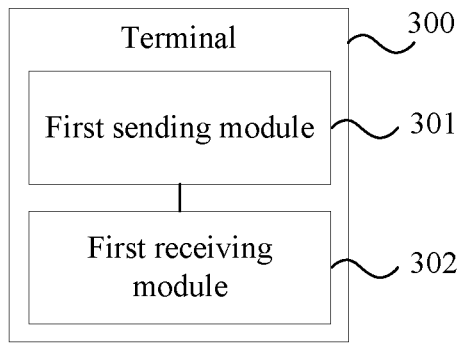
FIG. 3 is a schematic module diagram of a terminal according to an embodiment of the present disclosure.

As shown in FIG. 3, an embodiment of the present disclosure provides a terminal 300, including:

a first sending module 301, configured to: in a case that the terminal stores valid first configuration information, send first indication information to a network side device, where the first indication information is used to indicate that the terminal stores the valid first configuration information; and a first receiving module 302, configured to receive second indication information sent by the network side device, where the second indication information is used to indicate at least one of:
- whether the terminal uses the stored first configuration information;
- a number corresponding to the stored first configuration information used by the terminal; or
- a type corresponding to the stored first configuration information used by the terminal.

Optionally, before the first sending module 301 sends the first indication information to the network side device, the terminal further includes:

a third receiving module, configured to receive a configuration message sent by the network side device; and a first storing module, configured to store the first configuration information in the configuration message.

For example, the configuration message includes a number of configuration information.

Optionally, the first storing module is configured to:
obtain first information, and store the first configuration information in the configuration message based on the first information, where the first information includes at least one of:
third indication information, where the third indication information is used to indicate whether to store the first configuration information; or
a type corresponding to configuration information to be stored.

Optionally, the first information includes the third indication information, and an implementation in which the first storing module stores the first configuration information in the configuration message based on the first information is:

storing the first configuration information in the configuration message in a case that the third indication information indicates to store the first configuration information.

For example, the first information is indicated by the network side device.

Optionally, the first information includes the type corresponding to the configuration information to be stored, and an implementation in which the first storing module stores the first configuration information in the configuration message based on the first information is:

storing the first configuration information corresponding to the type in the configuration message.

For example, the first information is indicated by the network side device or is agreed upon in a protocol.

Optionally, before the third receiving module receives the configuration message sent by the network side device, the terminal further includes:

a third sending module, configured to send fourth indication information to the network side device, where the fourth indication information is used to indicate that the terminal has a capability of storing configuration information and reporting the configuration information.

Optionally, before the first sending module 301 sends the first indication information to the network side device, the terminal further includes:

an obtaining module, configured to obtain an identifier of a valid area corresponding to the configuration message sent by the network side device; and a second storing module, configured to store the identifier of the valid area, where the identifier of the valid area includes an identifier of a serving cell or an identifier of a cell group in which the serving cell is located.

For example, the identifier of the cell group is represented in one of:
a group identifier, a cell list, a radio access network based notification area list, a tracking area list, or a public land mobile network list.

Optionally, after the first storing module stores the first configuration information in the configuration message, the terminal further includes:
a setting module, configured to: if valid duration of the first configuration information stored by the terminal exceeds first duration, set a state of the first configuration information to an invalid state or delete the stored first configuration information, where
timing starts for the valid duration when the terminal receives the configuration message or the terminal stores the first configuration information.

For example, the first duration is configured by the network side device or is agreed upon in a protocol.

Optionally, before the first sending module 301 sends the first indication information to the network side device, the terminal further includes:
a fourth receiving module, configured to receive fifth indication information sent by the network side device, where the fifth indication information is used to indicate that the network side device allows the terminal to report the first indication information.

For example, the first indication information is carried in a first message, and the first message includes a radio resource control RRC setup request message, an RRC setup complete message, an RRC resume request message, an RRC resume complete message, an RRC connection re-setup request message, an RRC connection re-setup complete message, or a measurement report message.

For example, the first indication information carries at least one of:
an indication that the terminal stores the first configuration information;
a type of the first configuration information stored by the terminal; or
at least one number corresponding to the first configuration information.

Optionally, before the first sending module 301 sends the first indication information to the network side device, the terminal further includes:
a fifth receiving module, configured to receive a downlink message sent by the network side device, where the downlink message is used to trigger the terminal to report the first indication information.

Optionally, the second indication information is used to indicate whether the terminal uses the stored first configuration information, and after the first receiving module 302 receives the second indication information sent by the network side device, the terminal further includes:
a first processing module, configured to: if the second indication information is used to indicate the terminal to use the stored first configuration information, use the first configuration information.

Optionally, the second indication information is used to indicate at least one of the number corresponding to the stored first configuration information used by the terminal and the type corresponding to the stored first configuration information used by the terminal, and after the first receiving module 302 receives the second indication information sent by the network side device, the terminal further includes:
a second processing module, configured to use configuration information corresponding to the second indication information in the first configuration information.

Optionally, after the first sending module 301 sends the first indication information to the network side device, the terminal further includes:
a sixth receiving module, configured to receive second configuration information sent by the network side device, where
the second configuration information includes at least one of:
configuration information that is included in the first configuration information and that needs to be changed; or
configuration information that is not included in the first configuration information.

Optionally, after the sixth receiving module receives the second configuration information sent by the network side device, the terminal further includes:
a third processing module, configured to use the second configuration information.

Optionally, before the first sending module 301 sends the first indication information to the network side device, the terminal further includes:
a measurement module, configured to perform neighboring cell measurement to obtain a measurement result; and
the first sending module 301 is configured to:
if the measurement result includes a measurement result of a first cell and configuration information of a valid area to which the first cell belongs exists in the first configuration information stored by the terminal, send a measurement report message to the network side device, where the measurement report message carries the first indication information, and the first indication information is used to indicate that the terminal stores the configuration information of the valid area to which the first cell belongs.

Optionally, the first indication information is further used to indicate:
identifier information of the valid area corresponding to the first configuration information.

Optionally, the first configuration information is configuration information for a first area, and the first sending module 301 is configured to:
in a case that a second cell included in the first area is accessed, send the first indication information to the network side device corresponding to the second cell.

It should be noted that the terminal embodiment is the terminal corresponding to the foregoing configuration information obtaining method applied to the terminal. All implementations of the foregoing embodiment are applicable to the terminal embodiment, and a same technical effect can also be achieved.

Figure 4:
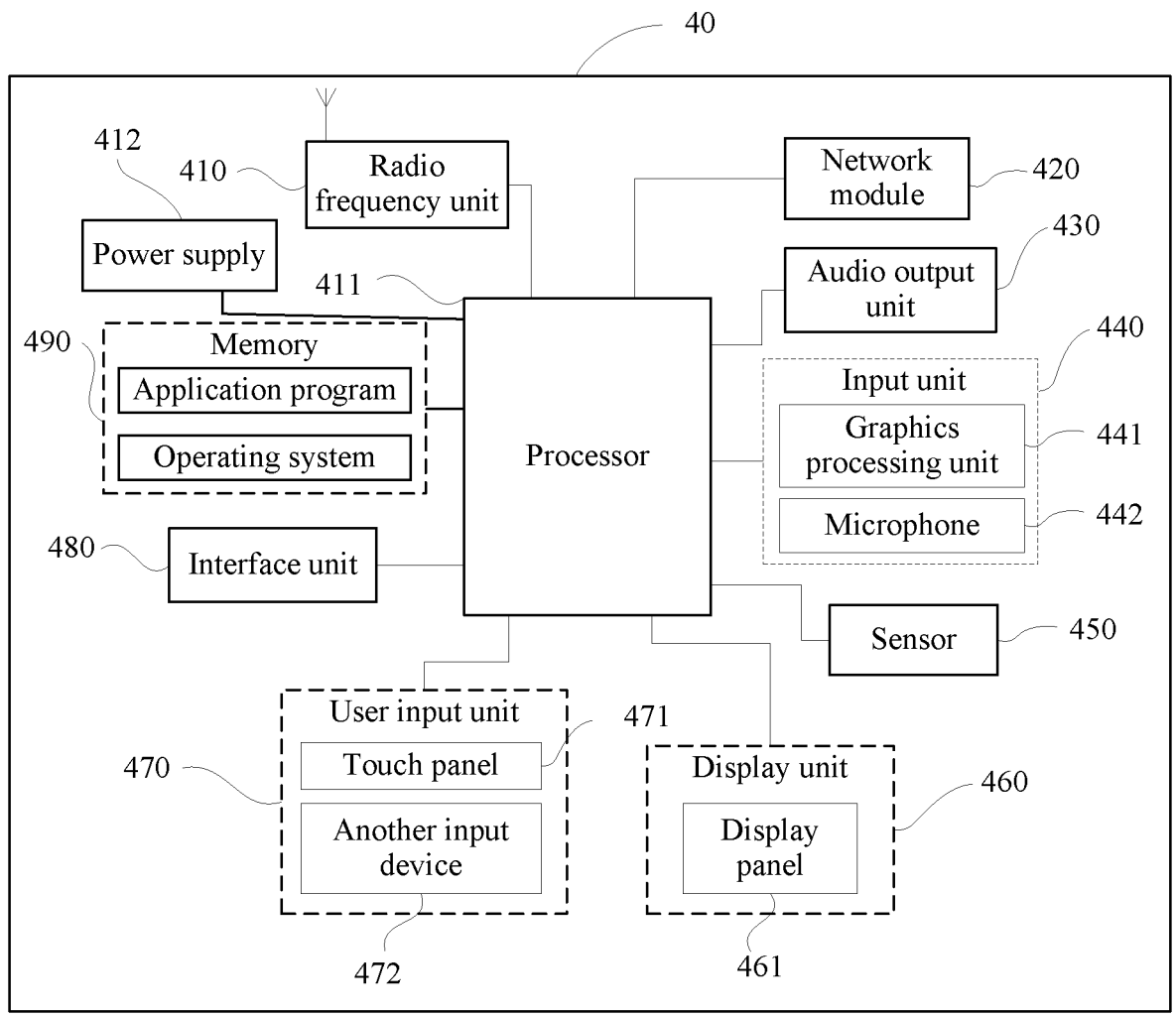
FIG. 4 is a structural block diagram of a terminal according to an embodiment of the present disclosure.

FIG. 4 is a schematic diagram of a hardware structure of a terminal according to an embodiment of the present disclosure.

A terminal 40 includes but is not limited to components such as a radio frequency unit 410, a network module 420, an audio output unit 430, an input unit 440, a sensor 450, a display unit 460, a user input unit 470, an interface unit 480, a memory 490, a processor 411, and a power supply 412. It can be understood by persons skilled in the art that, the terminal structure shown in FIG. 4 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a wearable device, a pedometer, and the like.

The radio frequency unit 410 is configured to: in a case that the terminal stores valid first configuration information, send first indication information to a network side device, where the first indication information is used to indicate that the terminal stores the valid first configuration information; and receive second indication information sent by the network side device, where the second indication information is used to indicate at least one of:

whether the terminal uses the stored first configuration information;

a number corresponding to the stored first configuration information used by the terminal; or a type corresponding to the stored first configuration information used by the terminal.

In this embodiment of the present disclosure, in a case that the terminal stores the valid first configuration information, the first indication information indicating that the terminal stores the valid first configuration information is sent to the network side device, to assist the network side device in feeding back the second indication information to the terminal. In this manner, the network side device does not need to send complete configuration information each time when the terminal accesses a network, so that signaling overheads for sending the configuration information by the network side device can be reduced.

It should be understood that, in this embodiment of the present disclosure, the radio frequency unit 410 may be configured to receive and send information or a signal in a call process. For example, after receiving downlink data from a network device, the radio frequency unit 410 sends the downlink data to the processor 411 for processing. In addition, the radio frequency unit 410 sends uplink data to the network device. Generally, the radio frequency unit 410 includes but is not limited to an antenna, at least one amplifier, a transceiver, a coupler, a low noise amplifier, a duplexer, and the like. In addition, the radio frequency unit 410 may communicate with a network and another device through a wireless communication system.

The terminal provides wireless broadband Internet access to a user through the network module 420, for example, helps the user receive and send e-mails, browse web pages, and access streaming media.

The audio output unit 430 may convert, into an audio signal, audio data received by the radio frequency unit 410 or the network module 420 or stored in the memory 490, and output the audio signal as sound. In addition, the audio output unit 430 may further provide an audio output (for example, a call signal received voice, or a message received voice) related to a specific function implemented by the terminal 40. The audio output unit 430 includes a speaker, a buzzer, a telephone receiver, and the like.

The input unit 440 is configured to receive an audio or video signal. The input unit 440 may include a graphics processing unit (GPU) 441 and a microphone 442. The graphics processing unit 441 processes image data of a static picture or a video obtained by an image capture apparatus (for example, a camera) in video capture mode or image capture mode. A processed image frame may be displayed on the display unit 460. The image frame processed by the graphics processing unit 441 may be stored in the memory 490 (or another storage medium) or sent by using the radio frequency unit 410 or the network module 420. The microphone 442 may receive a sound and can process such sound into audio data. Processed audio data can be converted, in telephone call mode, into a format that can be sent to a mobile communication network device via the radio frequency unit 410 for output.

The terminal 40 further includes at least one type of sensor 450, such as a light sensor, a motion sensor, and another sensor. For example, the light sensor includes an ambient light sensor and a proximity sensor. The ambient light sensor may adjust luminance of the display panel 461 based on brightness of ambient light. The proximity sensor may turn off the display panel 461 and/or backlight when the terminal 40 moves to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 450 may further include a fingerprint sensor, a pressure sensor, an iris sensor, a molecular sensor, a gyroscope, a barometer, a hygrometer, a thermometer, an infrared sensor, and the like. Details are not described herein.

The display unit 460 is configured to display information entered by a user or information provided for a user. The display unit 460 may include a display panel 461, and the display panel 461 may be configured in a form of a liquid crystal display (LCD), an organic light-emitting diode (OLED), or the like.

The user input unit 470 may be configured to receive input numeral or character information, and generate key signal input related to user setting and functional control of the terminal. For example, the user input unit 470 includes a touch panel 471 and another input device 472. The touch panel 471 is also referred to as a touchscreen, and may collect a touch operation performed by a user on or near the touch panel 471 (such as an operation performed by a user on the touch panel 471 or near the touch panel 471 by using any proper object or accessory, such as a finger or a stylus). The touch panel 471 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 411, and can receive and execute a command sent by the processor 411. In addition, the touch panel 471 may be of a resistive type, a capacitive type, an infrared type, a surface acoustic wave type, or the like. In addition to the touch panel 471, the user input unit 470 may further include the another input device 472. For example, the another input device 472 may include but is not limited to one or more of a physical keyboard, a function key (such as a volume control key or an on/off key), a trackball, a mouse, a joystick, and the like. Details are not described herein.

Optionally, the touch panel 471 may cover the display panel 461. When detecting the touch operation on or near the touch panel 471, the touch panel 471 transmits the touch operation to the processor 411 to determine a type of a touch event, and then the processor 411 provides corresponding visual output on the display panel 461 based on the type of the touch event. In FIG. 4, although the touch panel 471 and the display panel 461 are used as two independent parts to implement input and output functions of the terminal, in some embodiments, the touch panel 471 and the display panel 461 may be integrated to implement the input and output functions of the terminal. This is not specifically limited herein.

The interface unit 480 is an interface connecting an external apparatus to the terminal 40. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 480 may be configured to receive input (for example, data information and power) from the external apparatus and transmit the received input to one or more elements in the terminal 40, or may be configured to transmit data between the terminal 40 and the external apparatus.

The memory 490 may be configured to store a software program and various data. The memory 490 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 490 may include a high-speed random access memory, or may include a nonvolatile memory, for example, at least one disk storage device, a flash memory, or another volatile solid-state storage device.

The processor 411 is a control center of the terminal, and connects all parts of the entire terminal by using various interfaces and lines. By running or executing a software program and/or a module stored in the memory 490 and invoking data stored in the memory 490, the processor 411 performs various functions of the terminal and data processing, to perform overall monitoring on the terminal. The processor 411 may include one or more processing units. Optionally, the processor 411 may be integrated with an application processor and a modem processor. The application processor mainly processes an operating system, a user interface, an application program, and the like, and the modem processor mainly processes wireless communication. It can be understood that, alternatively, the modem processor may not be integrated into the processor 411.

The terminal 40 may further include a power supply 412 (such as a battery) that supplies power to each component. Optionally, the power supply 412 may be logically connected to the processor 411 by using a power management system, to implement functions such as charging, discharging, and power consumption management by using the power management system.

In addition, the terminal 40 includes some function modules not shown, and details are not described herein.

Optionally, an embodiment of the present disclosure further provides a terminal, including a processor 411, a memory 490, and a computer program that is stored in the memory 490 and executable on the processor 411. When the computer program is executed by the processor 411, the foregoing processes of the configuration information obtaining method embodiment applied to the terminal side are implemented and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the foregoing processes of the configuration information obtaining method embodiment applied to the terminal side are implemented and a same technical effect can be achieved. To avoid repetition, details are not described herein again. The non-transitory computer-readable storage medium includes a read-only memory (ROM), a random access memory (RAM), a magnetic disk, or an optical disc.

Figure 5:
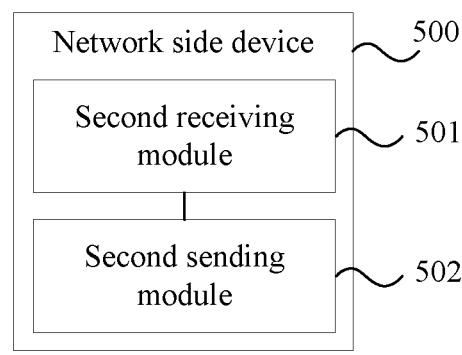
FIG. 5 is a schematic module diagram of a network side device according to an embodiment of the present disclosure.

As shown in FIG. 5, an embodiment of the present disclosure further provides a network side device 500, including:

a second receiving module 501, configured to receive first indication information sent by a terminal, where the first indication information is used to indicate that the terminal stores valid first configuration information; and a second sending module 502, configured to send second indication information to the terminal based on the first indication information, where the second indication information is used to indicate at least one of:

whether the terminal uses the stored first configuration information;

a number corresponding to the stored first configuration information used by the terminal; or a type corresponding to the stored first configuration information used by the terminal.

Optionally, before the second receiving module 501 receives the first indication information sent by the terminal, the network side device further includes:

a fourth sending module, configured to send a configuration message to the terminal, where the configuration message includes the first configuration information.

For example, the configuration message includes a number of configuration information.

Optionally, before the second receiving module 501 receives the first indication information sent by the terminal, the network side device further includes:

a fifth sending module, configured to send first information to the terminal, where the first information includes at least one of:

third indication information, where the third indication information is used to indicate whether to store the first configuration information; or a type corresponding to configuration information to be stored.

Optionally, before the fourth sending module sends the configuration message to the terminal, the network side device further includes:

a seventh receiving module, configured to receive fourth indication information sent by the terminal, where the fourth indication information is used to indicate that the terminal has a capability of storing configuration information and reporting the configuration information.

Optionally, before the second receiving module 501 receives the first indication information sent by the terminal, the network side device further includes:

a sixth sending module, configured to send an identifier of a valid area corresponding to the configuration message to the terminal, where the identifier of the valid area includes an identifier of a serving cell or an identifier of a cell group in which the serving cell is located.

For example, the identifier of the cell group is represented in one of:
  a group identifier, a cell list, a radio access network based notification area list, a tracking area list, or a public land mobile network list.

Optionally, before the second receiving module 501 receives the first indication information sent by the terminal, the network side device further includes:
  a seventh sending module, configured to send fifth indication information to the terminal, where the fifth indication information is used to indicate that the network side device allows the terminal to report the first indication information.

For example, the first indication information is carried in a first message, and the first message includes a radio resource control RRC setup request message, an RRC setup complete message, an RRC resume request message, an RRC resume complete message, an RRC connection re-setup request message, an RRC connection re-setup complete message, or a measurement report message.

Optionally, the first indication information carries at least one of:
  an indication that the terminal stores the first configuration information;
  a type of the first configuration information stored by the terminal; or
  at least one number corresponding to the first configuration information.

Optionally, before the second receiving module 501 receives the first indication information sent by the terminal, the network side device further includes:
  an eighth sending module, configured to send a downlink message to the terminal, where the downlink message is used to trigger the terminal to report the first indication information.

Optionally, after the second receiving module 501 receives the first indication information sent by the terminal, the network side device further includes:
  a ninth sending module, configured to send second configuration information to the terminal, where
  the second configuration information includes at least one of:
  configuration information that is included in the first configuration information and that needs to be changed; or
  configuration information that is not included in the first configuration information.

Optionally, the second receiving module 501 is configured to:
  receive a measurement report message fed back by the terminal, where the measurement report message carries first indication information, and the first indication information is used to indicate that configuration information of a valid area to which a first cell belongs exists in the first configuration information stored by the terminal; and
  after the second receiving module 501 receives the measurement report message fed back by the terminal, the network side device further includes:
  a configuration module, configured to: in a case of handover and addition of a secondary cell, perform differential configuration on the terminal based on the configuration information of the valid area to which the first cell belongs.

Optionally, the first indication information is further used to indicate:
  identifier information of the valid area corresponding to the first configuration information.

According to the network side device in this embodiment of the present disclosure, the second indication information is fed back to the terminal based on the first indication information that is sent by the terminal and that indicates that the terminal stores the valid first configuration information. In this manner, the network side device does not need to send complete configuration information each time when the terminal accesses a network, so that signaling overheads for sending the configuration information by the network side device can be reduced.

An embodiment of the present disclosure further provides a network side device, including a processor, a memory, and a computer program that is stored in the memory and executable on the processor. When the computer program is executed by the processor, the foregoing processes of the configuration information sending method embodiment applied to the network side device are implemented and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the foregoing processes of the configuration information sending method embodiment applied to the network side device are implemented and a same technical effect can be achieved. To avoid repetition, details are not described herein again. The non-transitory computer-readable storage medium includes a read-only memory (ROM), a random access memory (RAM), a magnetic disk, or an optical disc.

Figure 6:
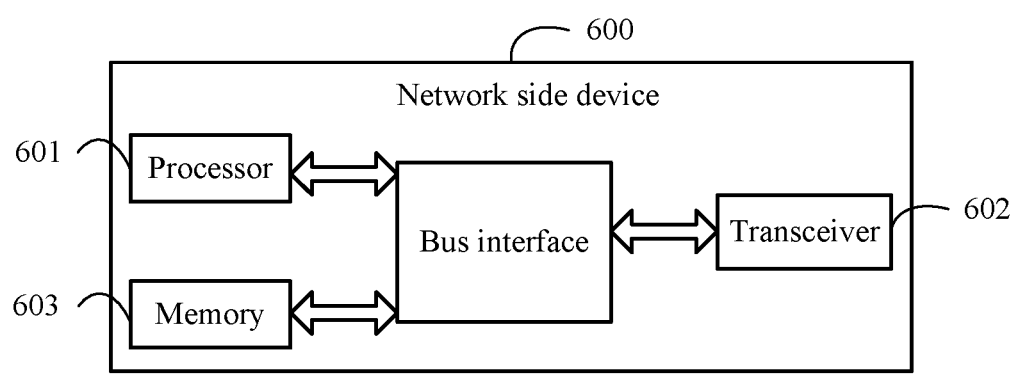
FIG. 6 is a structural block diagram of a network side device according to an embodiment of the present disclosure.

FIG. 6 is a structural diagram of a network side device according to an embodiment of the present disclosure, and the network side device can implement details of the foregoing configuration information sending method and achieve a same effect. As shown in FIG. 6, a network side device 600 includes a processor 601, a transceiver 602, a memory 603, and a bus interface.

The processor 601 is configured to read a program in the memory 603, to perform the following processes:
  receiving, by using the transceiver 602, first indication information sent by a terminal, where the first indication information is used to indicate that the terminal stores valid first configuration information; and sending second indication information to the terminal based on the first indication information, where
  the second indication information is used to indicate at least one of:
  whether the terminal uses the stored first configuration information;
  a number corresponding to the stored first configuration information used by the terminal; or
  a type corresponding to the stored first configuration information used by the terminal.

In FIG. 6, a bus architecture may include any quantity of interconnected buses and bridges. Various circuits of one or more processors represented by the processor 601 and a memory represented by the memory 603 are interconnected. The bus architecture may further link various other circuits such as a peripheral device, a voltage regulator, and a power management circuit. These are well known in the art, and therefore are not further described in this specification. The bus interface provides an interface. The transceiver 602 may be a plurality of components. To be specific, the transceiver 602 includes a transmitter and a receiver, and provides a unit configured to communicate with various other apparatuses on a transmission medium.

Optionally, before receiving the first indication information sent by the terminal, the processor 601 is configured to read the program in the memory 603, to perform the following process:

sending a configuration message to the terminal by using the transceiver 602, where the configuration message includes the first configuration information.

For example, the configuration message includes a number of configuration information.

Optionally, before receiving the first indication information sent by the terminal, the processor 601 is configured to read the program in the memory 603, to perform the following process:

sending first information to the terminal by using the transceiver 602, where the first information includes at least one of:

third indication information, where the third indication information is used to indicate whether to store the first configuration information; or a type corresponding to configuration information to be stored.

Optionally, before sending the configuration message to the terminal, the processor 601 is configured to read the program in the memory 603, to perform the following process:

receiving, by using the transceiver 602, fourth indication information sent by the terminal, where the fourth indication information is used to indicate that the terminal has a capability of storing configuration information and reporting the configuration information.

Optionally, before receiving the first indication information sent by the terminal, the processor 601 is configured to read the program in the memory 603, to perform the following process:

sending an identifier of a valid area corresponding to the configuration message to the terminal by using the transceiver 602, where the identifier of the valid area includes an identifier of a serving cell or an identifier of a cell group in which the serving cell is located.

For example, the identifier of the cell group is represented in one of:

a group identifier, a cell list, a radio access network based notification area list, a tracking area list, or a public land mobile network list.

Optionally, before receiving the first indication information sent by the terminal, the processor 601 is configured to read the program in the memory 603, to perform the following process:

sending fifth indication information to the terminal by using the transceiver 602, where the fifth indication information is used to indicate that the network side device allows the terminal to report the first indication information.

For example, the first indication information is carried in a first message, and the first message includes a radio resource control RRC setup request message, an RRC setup complete message, an RRC resume request message, an RRC resume complete message, an RRC connection re-setup request message, an RRC connection re-setup complete message, or a measurement report message.

Optionally, the first indication information carries at least one of:

an indication that the terminal stores the first configuration information;

a type of the first configuration information stored by the terminal; or at least one number corresponding to the first configuration information.

Optionally, before receiving the first indication information sent by the terminal, the processor 601 is configured to read the program in the memory 603, to perform the following process:

sending a downlink message to the terminal by using the transceiver 602, where the downlink message is used to trigger the terminal to report the first indication information.

Optionally, after receiving the first indication information sent by the terminal, the processor 601 is configured to read the program in the memory 603, to perform the following process:

sending second configuration information to the terminal by using the transceiver 602, where the second configuration information includes at least one of:

configuration information that is included in the first configuration information and that needs to be changed; or configuration information that is not included in the first configuration information.

Optionally, the processor 601 is configured to read the program that is in the memory 603 and that is used to receive the first indication information sent by the terminal, to perform the following process:

receiving, by using the transceiver 602, a measurement report message fed back by the terminal, where the measurement report message carries first indication information, and the first indication information is used to indicate that configuration information of a valid area to which a first cell belongs exists in the first configuration information stored by the terminal; and after the receiving a measurement report message fed back by the terminal, the following process is further included:

in a case of handover and addition of a secondary cell, performing differential configuration on the terminal based on the configuration information of the valid area to which the first cell belongs.

For example, the first indication information is further used to indicate:

identifier information of the valid area corresponding to the first configuration information.

The network side device may be a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB), a relay station, or an access point in LTE, or a base station in a future 5G network, or the like. This is not limited herein.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

What is claimed is:

1. A configuration information obtaining method, applied to a terminal and comprising:

in a case that the terminal stores valid first configuration information, sending first indication information to a network side device, wherein the first indication information is used to indicate that the terminal stores the valid first configuration information; and
receiving second indication information sent by the network side device, wherein
the second indication information is used to indicate at least one of:
whether the terminal uses the stored first configuration information;
a number corresponding to the stored first configuration information used by the terminal; or
a type corresponding to the stored first configuration information used by the terminal;
wherein after the sending first indication information to a network side device, the method further comprises:
receiving second configuration information sent by the network side device, wherein
the second configuration information comprises at least one of:
configuration information that is comprised in the first configuration information and that needs to be changed; or
configuration information that is not comprised in the first configuration information.

2. The configuration information obtaining method according to claim 1, before the sending first indication information to a network side device, further comprising:
receiving a configuration message sent by the network side device; and
storing the first configuration information in the configuration message, wherein
the configuration message comprises a number of configuration information.

3. The configuration information obtaining method according to claim 2, wherein the storing the first configuration information in the configuration message comprises:
obtaining first information, and storing the first configuration information in the configuration message based on the first information, wherein
the first information comprises at least one of:
third indication information, wherein the third indication information is used to indicate whether to store the first configuration information; or a type corresponding to configuration information to be stored.

4. The configuration information obtaining method according to claim 3, wherein the first information comprises the third indication information, and the storing the first configuration information in the configuration message based on the first information comprises:
storing the first configuration information in the configuration message in a case that the third indication information indicates storage of the first configuration information.

5. The configuration information obtaining method according to claim 2, before the receiving a configuration message sent by the network side device, further comprising:
sending fourth indication information to the network side device, wherein the fourth indication information is used to indicate that the terminal has a capability of storing configuration information and reporting the configuration information.

6. The configuration information obtaining method according to claim 2, before the sending first indication information to a network side device, further comprising:
obtaining an identifier of a valid area corresponding to the configuration message sent by the network side device; and
storing the identifier of the valid area, wherein
the identifier of the valid area comprises an identifier of a serving cell or an identifier of a cell group in which the serving cell is located.

7. The configuration information obtaining method according to claim 2, after the storing the first configuration information in the configuration message, further comprising:
if valid duration of the first configuration information stored by the terminal exceeds first duration, setting a state of the first configuration information to an invalid state or deleting the stored first configuration information, wherein
timing starts for the valid duration when the terminal receives the configuration message or the terminal stores the first configuration information.

8. The configuration information obtaining method according to claim 1, before the sending first indication information to a network side device, further comprising:
receiving fifth indication information sent by the network side device, wherein the fifth indication information is used to indicate that the network side device allows the terminal to report the first indication information.

9. The configuration information obtaining method according to claim 1, wherein the first indication information carries at least one of:
an indication that the terminal stores the first configuration information;
a type of the first configuration information stored by the terminal; or
at least one number corresponding to the first configuration information.

10. The configuration information obtaining method according to claim 1, before the sending first indication information to a network side device, further comprising:
receiving a downlink message sent by the network side device, wherein the downlink message is used to trigger the terminal to report the first indication information.

11. The configuration information obtaining method according to claim 1, wherein the second indication information is used to indicate whether the terminal uses the stored first configuration information, and after the receiving second indication information sent by the network side device, the method further comprises:
if the second indication information is used to indicate that the terminal to use the stored first configuration information, using, by the terminal, the first configuration information.

12. The configuration information obtaining method according to claim 1, wherein the second indication information is used to indicate at least one of the number corresponding to the stored first configuration information used by the terminal and the type corresponding to the stored first configuration information used by the terminal, and after the receiving second indication information sent by the network side device, the method further comprises:
using, by the terminal, configuration information corresponding to the second indication information in the first configuration information.

13. The configuration information obtaining method according to claim 1, before the sending first indication information to a network side device, further comprising:

performing neighboring cell measurement to obtain a measurement result; and the sending first indication information to a network side device comprises:

if the measurement result comprises a measurement result of a first cell and configuration information of a valid area to which the first cell belongs exists in the first configuration information stored by the terminal, sending a measurement report message to the network side device, wherein the measurement report message carries the first indication information, and the first indication information is used to indicate that the terminal stores the configuration information of the valid area to which the first cell belongs.

14. The configuration information obtaining method according to claim 1, wherein the first configuration information is configuration information for a first area, and the sending first indication information to a network side device comprises:

in a case that a second cell comprised in the first area is accessed, sending the first indication information to the network side device corresponding to the second cell.

15. A configuration information sending method, applied to a network side device and comprising:

receiving first indication information sent by a terminal, wherein the first indication information is used to indicate that the terminal stores valid first configuration information; and sending second indication information to the terminal based on the first indication information, wherein the second indication information is used to indicate at least one of:

whether the terminal uses the stored first configuration information;

a number corresponding to the stored first configuration information used by the terminal; or a type corresponding to the stored first configuration information used by the terminal;

wherein after the receiving first indication information sent by a terminal, the method further comprises:

sending second configuration information to the terminal, wherein the second configuration information comprises at least one of:

configuration information that is comprised in the first configuration information and that needs to be changed; or configuration information that is not comprised in the first configuration information.

16. The configuration information sending method according to claim 15, before the receiving first indication information sent by a terminal, further comprising:

sending a configuration message to the terminal, wherein the configuration message comprises the first configuration information.

17. The configuration information sending method according to claim 15, wherein the receiving first indication information sent by a terminal comprises:

receiving a measurement report message fed back by the terminal, wherein the measurement report message carries first indication information, and the first indication information is used to indicate that configuration information of a valid area to which a first cell belongs exists in the first configuration information stored by the terminal; and after the receiving a measurement report message fed back by the terminal, the method further comprises:

in a case of handover of a cell and addition of a secondary cell, performing differential configuration on the terminal based on the configuration information of the valid area to which the first cell belongs.

18. A terminal, comprising a memory, a processor, and a computer program that is stored in the memory and executable on the processor, wherein the computer program, when executed by the processor, causes the terminal to perform:

in a case that the terminal stores valid first configuration information, sending first indication information to a network side device, wherein the first indication information is used to indicate that the terminal stores the valid first configuration information; and receiving second indication information sent by the network side device, wherein the second indication information is used to indicate at least one of:

whether the terminal uses the stored first configuration information;

a number corresponding to the stored first configuration information used by the terminal; or a type corresponding to the stored first configuration information used by the terminal;

wherein after the sending first indication information to a network side device, the computer program, when executed by the processor, causes the terminal further to perform:

receiving second configuration information sent by the network side device, wherein the second configuration information comprises at least one of:

configuration information that is comprised in the first configuration information and that needs to be changed; or configuration information that is not comprised in the first configuration information.

* * * * *